Figure 1:
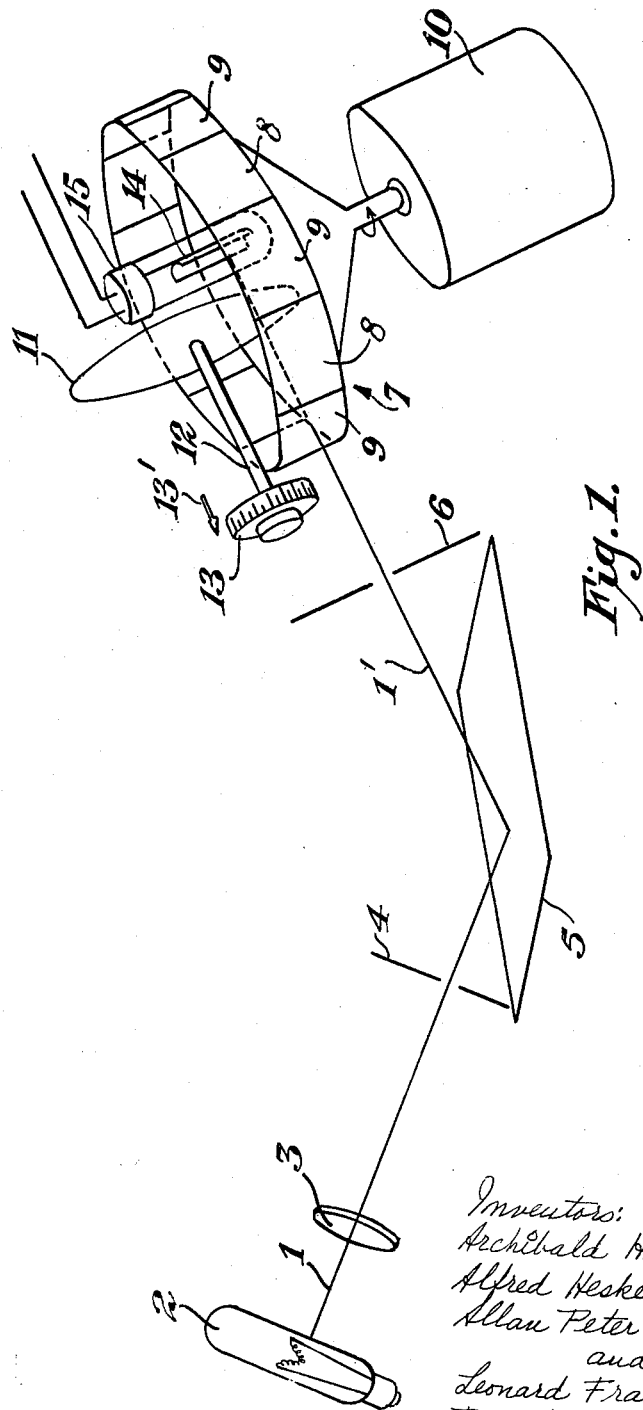

Dec. 30, 1958    A. H. WELLS ET AL    2,866,375
GLOSS METER
Filed Sept. 28, 1954    2 Sheets-Sheet 1

Inventors:
Archibald Howard Wells,
Alfred Heskel Nissan,
Allan Peter Highton
and
Leonard Frank Hopkins
By their attorneys:
Baldwin & Wight Dec. 30, 1958   A. H. WELLS ET AL   2,866,375
GLOSS METER
Filed Sept. 28, 1954   2 Sheets-Sheet 2

Inventors:
Archibald Howard Wells,
Alfred Heskel Nissan,
Allan Peter Highton
and
Leonard Frank Hopkins
By their attorneys:
Baldwin & Wight United States Patent Office 2,866,375
Patented Dec. 30, 1958

2,866,375

GLOSS METER

Archibald Howard Wells, Gravesend, Kent, Alfred H. Nissan, Leeds, Allan Peter Highton, Gravesend, Kent, and Leonard Frank Hopkins, Brockley, London, England, assignors to The Bowater Research and Development Company Limited Application September 28, 1954, Serial No. 458,924

Claims priority, application Great Britain October 12, 1953

4 Claims. (Cl. 88—14)

The invention comprises an improved gloss meter e. g. for measuring the glossiness of a sheet of paper.

When light is reflected from a sheet of paper, some of the reflected light is diffusely reflected, that is to say, it is scattered in all directions, whilst the remaining light is specularly reflected, i. e. it is reflected in such a way that the angle of incidence is equal to the angle of reflection. The specularly reflected light is polarized, the extent of polarization depending upon the angle of incidence of the light to the sheet of paper. The glossier the paper sheet, the higher is the ratio of specularly reflected to diffusely reflected light and hence the greater is the percentage of polarized light in the reflected beam. Thus, by measuring the percentage of polarized light in the reflected beam there is provided a measure of the glossiness of the paper.

In a known gloss meter the beam of light reflected from the paper is directed on to a Wollaston prism whereby it is split into two components which are polarized at right-angles to each other. One of the components contains all the specularly reflected light and half the diffuse light while the other component contains half the diffuse light only. The two components then pass through an analyser in the form of a rotatably mounted Nicol prism. Rotation of the Nicol prism serves to alter the relative intensities of the two components which emerge therefrom. In operation, the Nicol prism is rotated until the two components which emerge therefrom are of equal intensity so far as can be judged by the eyes of an operator. The angular position of the Nicol prism then gives a measure of the percentage of specularly reflected light in the beam reflected from the paper.

It is the object of the present invention to devise an improved gloss meter which does not require the relative intensities of beams of light to be judged by eye. It is a further object of the invention to devise an improved gloss meter which will permit a reading to be taken over a larger area than has hitherto been possible of the material whose glossiness is to be tested.

According to the invention, a device for measuring the glossiness of a surface comprises polarizing elements having respectively their polarizing axes in different directions, means for alternately interposing the polarizing elements in the path of a beam of light reflected from the surface so that there is produced, due to differential absorption of specularly reflected light, a beam of fluctuating intensity, said beam being alternately polarized in said directions, a polarizing member (hereinafter called an analyser), means for interposing the analyser in the path of the fluctuating beam so that the axis of polarization thereof may be varied with respect to the beam, whereby the fluctuation of the beam may be substantially eliminated, and light-sensitive means for indicating a substantially non-fluctuating beam, the setting of the analyser when such indication is given by the light-sensitive means thus determining said glossiness.

The device may comprise two polarizing elements only, in which case means may be provided for oscillating the elements across the reflected beam. Alternatively there may be employed a series of polarizing elements (e. g. on an endless band) of which each adjacent pair have their polarizing axes in said different directions, and means for moving the series continuously across the reflected beam of light.

The analyser may be a sheet adapted to be displaced, e. g. rotated, to vary the inclination of its axis of polarization to the fluctuating beam.

The light-sensitive means is preferably a photo-electric cell disposed behind the analyser, the fluctuating output from the photo-electric cell being passed through an A. C. amplifier, rectified and displayed on a suitable indicating meter.

We have found it advisable to provide opaque interruptions at the joints between adjacent polarizing elements. If no such interruptions are provided and the output from the photo-electric cell is displayed on an oscilloscope, the interference due to the joints is shown to be of considerable amplitude. When the analyser is set so that the fluctuating beam is rendered non-fluctuating, the output from the photo-electric cell will not be steady since it will contain a component due to the joints. If, however, opaque interruptions are provided at the joints, the said output will contain a component due to the interruptions and the frequency of this component will be twice that of the fundamental frequency of the wave due to the fluctuating beam. Since this component is in the form of a clearly defined wave of different frequency from the required signal it may be removed by means of an electric filter circuit. The removal of this component is made easier when its frequency is fairly remote from the fundamental frequency. Hence it is preferred to provide a further number of opaque interruptions equally spaced on each polarizing element whereby to raise the frequency of the said component to a higher harmonic. It has, for example, been found that two further strips giving the sixth harmonic are satisfactory. This harmonic may be eliminated by means of a narrow pass band filter tuned to the fundamental which is left as a sine wave which diminishes to a straight line when the analyser is set so as to produce a non-fluctuating beam.

Figure 2:
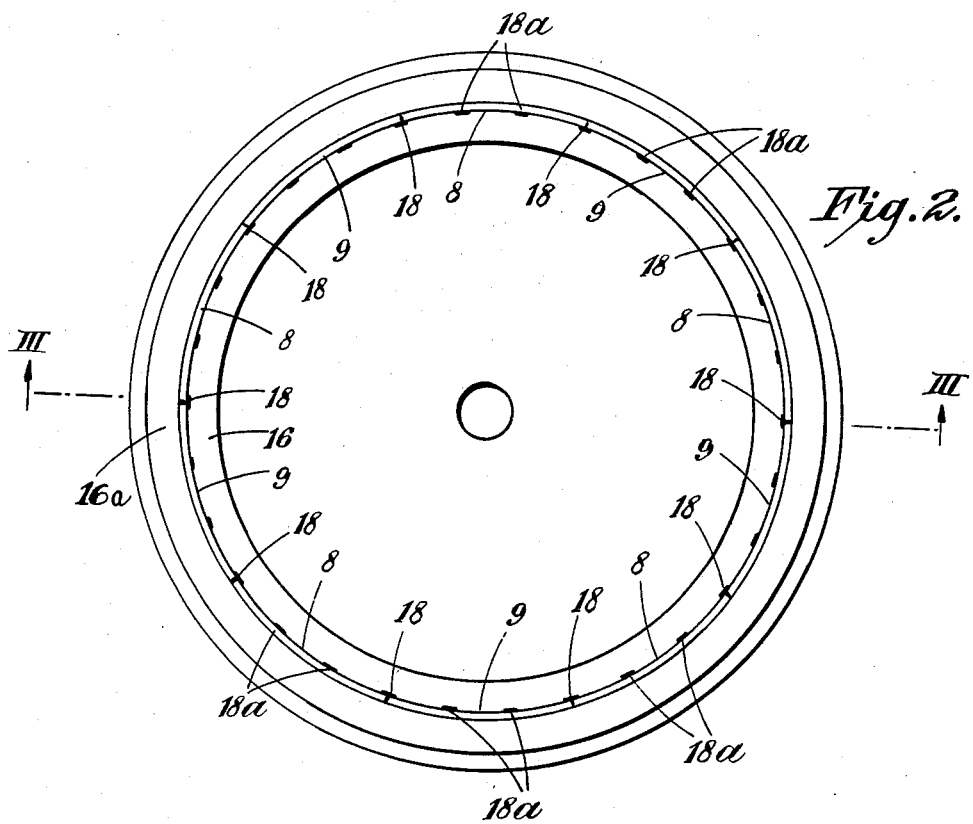
Figure 3:
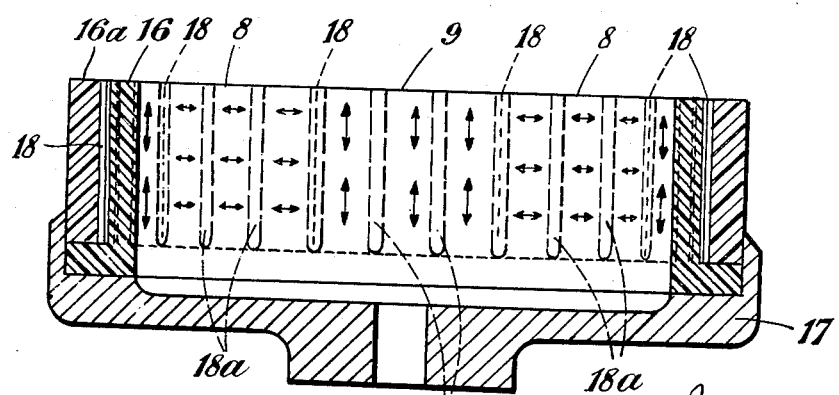

The invention is illustrated by way of example in the accompanying drawings, wherein Figure 1 shows a schematic representation of a device according to the invention, Figure 2 shows a plan view of a drum incorporating the polarizing elements, and Figure 3 is a cross section of the drum on the line III—III of Figure 2.

Referring to the drawing, a beam of light 1 from a filament lamp 2 is directed by way of a lens 3 and an apertured diaphragm 4 on to a sheet of paper 5 the glossiness of which is required to be determined. The angle of incidence of the beam 1 to the sheet of paper 5 is, for example, 57½°, although other angles of incidence may be employed if desired. Preferably the beam 1 is caused to illuminate an area of about 1 square inch on the sheet of paper.

The sheet of paper directs a reflected beam 1' by way of an apertured diaphragm 6 on to a polarizing drum 7. The cylindrical wall of the polarizing drum 7 is composed of polarizing elements alternately marked 8 and 9. The elements 8 have their polarizing axes at right-angles to those of the elements 9, the polarizing axes of, say, the elements 8 running circumferentially round the drum while the polarizing axes of the elements 9 run axially.

The drum 7 (Figures 2 and 3) may consist of two concentric cylinders 16, 16a of non-polarizing transparent material with the elements 8, 9 sandwiched between the two cylinders. The cylinders may be made from an acrylic resin such as is sold under the registered trademark "Perspex." The polarizing elements may be formed from the material sold under the registered trademark "Polaroid."

As described above, opaque interruptions 18 are provided between the polarizing elements 8, 9 and further opaque interruptions 18a are provided on each element to raise the frequency of the component of the output of the photo-electric cell due to the interruptions.

The drum 7 is rotatably mounted, for example on a plate 17, and is connected to a motor 10 which causes it to rotate. It will be appreciated that the reflected beam 1' contains both specularly reflected and diffusely reflected light, the specularly reflected light being partially polarized in a direction parallel to the sheet of paper 5. Therefore the rotation of the drum will cause the light passing therethrough to be fluctuating, since the light passing through the elements 8 whose polarizing axes are parallel to the specularly reflected light will contain both specularly reflected and diffusely reflected light while the light passing through the elements 9 will contain diffusely reflected light only.

The fluctuating beam of light is passed through an analyser 11 which is in the form of a disc which is angularly adjustable about an axis parallel to the fluctuating beam. In the drawing the analyser is shown as being rotatable by means of a spindle 12 carrying a scale 13 which is calibrated in degrees and which is read by means of a fixed pointer 13'. The spindle is preferably hand-rotated by means of worm gearing (not shown). Since the scale 13 is connected to the analyser, backlash in the worm gearing does not affect the scale reading.

The beam of light which has passed through the analyser is directed on to the cathode 14 of a photo-electric cell 15, the output from the photo-electric cell being passed to a frequency-selective three-stage A. C. amplifier (not shown). The output from the amplifier is rectified and displayed on a suitable indicating meter.

In operation the sheet of paper is placed in position and the analyser is rotated until the A. C. output from the photo-electric cell is at its minimum. The reading given on the scale 13 is then a measure of the gloss of the sheet being tested.

It has been found that the size of the polarizing drum 7 does not significantly affect the reading given by the meter.

The meter may be calibrated upon the assumption that 100% diffuse light corresponds to a paper sample of zero glossiness. If this assumption be made, the beam will be non-fluctuating with a paper sample of zero gloss when the analyser is set at an angle of 45° to either elements 8, 9. The known gloss meter is set at zero when the analyser is at 60° to the direction of polarization of the specularly reflected light. Thus, the readings given by the device illustrated in the drawing may be changed to degrees by adding 15°. Alternatively the scale may be adapted to read directly in degrees conforming to the scale of values of the known gloss meter.

If it is desired to estimate the zero error on the device according to the invention a sheet of paper is placed in the device. The A. C. output from the photo-electric cell should be a minimum at two points, one of which will correspond to a setting of the analyser between 0–45° and the other of which will correspond to a setting of 45–90°, these two settings being symmetrical about the 45° position. Thus, if these two readings are obtained then their arithmetic mean will be the true 45° position. Thus, zero error may be obtained by noting the difference between the true 45° position and that shown on the scale.

A servo-motor, controlled by the photo-electric cell, may, if desired, be employed for rotating the analyser automatically, rotation of the analyser being stopped when the two components emerging therefrom are of equal intensity, whereby a gloss reading will be automatically obtained. Means may be provided for printing this reading automatically on a paper strip. The device according to the invention may also, if desired, be adapted to give a continuous indication of the gloss of a paper web as it is produced.

What is claimed is:

1. In a device for measuring the glossiness of a surface, two concentric cylinders of transparent non-polarizing material; an endless series of polarizing elements sandwiched between and supported by said cylinders and respectively having their polarizing axes in different directions; light sensitive means for indicating a substantially non-fluctuating beam; a polarizing analyzer positioned between said light-sensitive means and said polarizing elements; means including a light source for causing a beam of light to strike said surface at an angle of incidence thereto and to be reflected continuously therefrom and to pass to said cylinders and polarizing elements as a continuous and substantially unvarying beam constituted in part by diffused light and in part by specularly reflected light and to pass through said cylinders and the polarizing elements as said polarizing elements are successively moved into the path of said continuous and substantially unvarying reflected beam; means for rotating said cylinders so as successively to move said polarizing elements with respect to said reflected beam so as alternately to place polarizing elements having differently directed polarizing axes in the path of said reflected beam whereby to effect differential absorption of light continuously reflected specularly from said surface and consequently to effect alternate polarization and fluctuation of the beam transmitted from said polarizing elements through said polarizing analyzer and to said light-sensitive means; and means for varying the axis of polarization of said polarizing analyzer with respect to the beam passing therethrough, whereby the fluctuation of the beam may be substantially eliminated.

2. A device as claimed in claim 1 in which the two polarizing elements of each adjacent pair of said polarizing elements in said endless series of polarizing elements have their polarizing axes in said different directions.

3. A device as set forth in claim 1 in which at least one opaque interruption is positioned intermediate the joints between adjacent polarizing elements.

4. In a device for measuring the glossiness of a surface, two concentric cylinders of transparent non-polarizing material; an endless series of adjoining polarizing elements sandwiched between and supported by said cylinders and respectively having their polarizing axes in different directions; opaque interruptions positioned respectively between adjacent polarizing elements of differently directed polarizing axes; light sensitive means for indicating a substantially non-fluctuating beam; a polarizing analyzer positioned between said light-sensitive means and said polarizing elements; means including a light source for causing a beam of light to strike said surface at an angle of incidence thereto and to be reflected continuously therefrom and to pass to said cylinders and polarizing elements as a continuous and substantially unvarying beam constituted in part by diffused light and in part by specularly reflected light and to pass through said cylinders and the polarizing elements as said polarizing elements are successively moved into the path of said continuous and substantially unvarying reflected beam; means for rotating said cylinders so as successively to move said polarizing elements with respect to said reflected beam so as alternately to place polarizing elements having differently directed polarizing axes in the path of said reflected beam whereby to effect differential absorption of light continuously reflected specularly from said surface and consequently to effect alternate polarization and fluctuation of the beam transmitted from said polarizing elements through said polarizing analyzer and to said light-sensitive means; and means for varying the axis of polarization of said polarizing analyzer with respect to the beam passing therethrough, whereby the fluctuation of the beam may be substantially eliminated.

References Cited in the file of this patent

UNITED STATES PATENTS

| | | |
|---|---|---|
| 1,976,728 | Hulburt | Oct. 16, 1934 |
| 1,988,556 | Hunter | Jan. 23, 1935 |
| 2,032,128 | Horsfield | Feb. 25, 1936 |
| 2,127,477 | Carpenter et al. | Aug. 16, 1938 |
| 2,450,761 | MacNeille | Oct. 5, 1948 |
| 2,583,186 | Mueller | Jan. 22, 1952 |

FOREIGN PATENTS

| | | |
|---|---|---|
| 1,080,432 | France | June 2, 1954 |